US011973239B2

(12) United States Patent
Yokoyama et al.

(10) Patent No.: US 11,973,239 B2
(45) Date of Patent: Apr. 30, 2024

(54) PROTECTION STRUCTURE FOR ON-BOARD BATTERY

(71) Applicant: SUBARU CORPORATION, Tokyo (JP)

(72) Inventors: Yutaka Yokoyama, Tokyo (JP); Toshiyuki Hara, Tokyo (JP); Shinichi Kimura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/686,188

(22) Filed: Mar. 3, 2022

(65) Prior Publication Data

US 2022/0302542 A1 Sep. 22, 2022

(30) Foreign Application Priority Data

Mar. 17, 2021 (JP) ................................. 2021-043834

(51) Int. Cl.
*H01M 50/249* (2021.01)
*B60K 1/04* (2019.01)
*H01M 50/242* (2021.01)

(52) U.S. Cl.
CPC ............. *H01M 50/249* (2021.01); *B60K 1/04* (2013.01); *H01M 50/242* (2021.01); *H01M 2220/20* (2013.01)

(58) Field of Classification Search
CPC ....... B60K 2001/0416; B60Y 2306/01; H01M 50/249
See application file for complete search history.

(56) References Cited

U.S. PATENT DOCUMENTS

| 7,051,825 | B2* | 5/2006 | Masui | B60L 50/16 280/783 |
| 7,396,075 | B2* | 7/2008 | Ohkuma | B60N 2/36 297/15 |
| 2009/0166116 | A1* | 7/2009 | Kiya | H01M 50/209 180/68.5 |
| 2010/0273040 | A1* | 10/2010 | Kubota | H01M 50/249 429/100 |
| 2011/0011654 | A1* | 1/2011 | Kubota | B60L 50/64 903/903 |
| 2012/0318591 | A1* | 12/2012 | Lim | B60K 1/04 903/903 |

(Continued)

FOREIGN PATENT DOCUMENTS

JP 6688275 B2 4/2020

*Primary Examiner* — Frank B Vanaman
(74) *Attorney, Agent, or Firm* — MCGINN I.P. LAW GROUP, PLLC (57) ABSTRACT

A protection structure for an on-board battery. The on-board battery includes a battery stack and is configured to be mounted on a vehicle. The protection structure includes a first frame, a second frame, and a fixing member. The first frame is to be coupled to an upper portion of a battery case that contains the battery stack, so as to fix the battery case to a vehicle body of the vehicle. The second frame is to be disposed above the battery case and to be coupled to the first frame. The fixing member is to be fixed to the second frame so as to suspend and support the battery stack. The second frame is to be disposed in a direction crossing a longer direction of the battery stack and at least at an approximate center in the longer direction of the battery stack.

6 Claims, 11 Drawing Sheets

(56) References Cited

U.S. PATENT DOCUMENTS

| | | | |
|---|---|---|---|
| 2013/0313030 A1* | 11/2013 | Matsumura | B60L 50/64 |
| | | | 180/68.5 |
| 2013/0333962 A1* | 12/2013 | Lee | B60L 50/60 |
| | | | 429/152 |
| 2014/0117716 A1* | 5/2014 | Patberg | B62D 21/15 |
| | | | 296/187.08 |
| 2015/0214522 A1* | 7/2015 | Muck | H01M 50/209 |
| | | | 429/120 |
| 2016/0368394 A1* | 12/2016 | Murase | H01M 50/249 |
| 2017/0029034 A1* | 2/2017 | Faruque | B62D 21/157 |
| 2017/0174064 A1* | 6/2017 | Shinoda | B62D 21/02 |
| 2019/0184831 A1 | 6/2019 | Yokoyama et al. | |
| 2019/0355948 A1* | 11/2019 | Smith | H01M 10/625 |
| 2021/0387550 A1* | 12/2021 | Lee | B62D 25/2036 |

\* cited by examiner

FIG. 12

PROTECTION STRUCTURE FOR ON-BOARD BATTERY

CROSS-REFERENCE TO RELATED APPLICATIONS

The present application claims priority from Japanese Patent Application No. 2021-043834 filed on Mar. 17, 2021, the entire contents of which are hereby incorporated by reference.

BACKGROUND

The disclosure relates to a protection structure for an on-board battery, and in particular, relates to a protection structure for an on-board battery, the protection structure being configured to hold a battery stack while suspending the battery stack by a frame fixed to a vehicle body, thereby protecting the battery stack from travelling vibration and collision impact of the vehicle.

Existing protection structures for vehicle battery packs include a protection structure disclosed in Japanese Patent No. 6688275, for example.

The protection structure for a vehicle battery pack protects a vehicle battery pack including plural battery stacks and so on, and includes a battery pack housing that houses the vehicle battery pack. The battery pack housing includes a container that contains the battery pack, and each frame that supports peripheral parts of the container.

The container is disposed in a housing space that is provided in a rear floor of a vehicle, and each frame is coupled to a vehicle body around the housing space. The container has an approximately box shape and contains, for example, four battery stacks. The battery stack has connection terminals, each which is coupled to an electronic device, such as a junction box or a battery control unit (BCU), via electric wiring.

SUMMARY

An aspect of the disclosure provides a protection structure for an on-board battery. The on-board battery includes a battery stack and is configured to be mounted on a vehicle. The protection structure includes a first frame, a second frame, and a fixing member. The first frame is to be coupled to an upper portion of a battery case that contains the battery stack, so as to fix the battery case to a vehicle body of the vehicle. The second frame is to be disposed above the battery case and to be coupled to the first frame. The fixing member is to be fixed to the second frame so as to suspend and support the battery stack. The second frame is to be disposed in a direction crossing a longer direction of the battery stack and at least at an approximate center in the longer direction of the battery stack.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

To address recent electrification of vehicles, high output and high capacity are desired in vehicle batteries. To achieve high output and high capacity of vehicle batteries, the number of battery stacks that contain plural battery cells is increased. This causes increase in the number of components constituting the battery stacks, such as end plates and constraint plates, and increase in the amount of electric wiring, whereby production cost is increased, and the weight of the whole vehicle battery pack is also increased. The increase in the amount of electric wiring causes increase in internal resistance of the battery pack.

In addition, plural battery stacks are fixed to a container, which uses a frame structure for protecting the battery stacks from collision impact of a vehicle. This causes increase in production cost and weight of the container.

The above-described problems relating to increase in the number of battery stacks may be solved by increasing the number of battery cells contained in one battery stack. The increase in the number of battery cells causes increase in the whole length in the direction of stacking the battery cells of the battery stack. Thus, unfortunately, due to vibration of a vehicle, vibration amplitude, particularly in an intermediate area of the battery stack, is enlarged. As a result, the battery cell in the intermediate area of the battery stack may hit surrounding components and be broken due to the vibration.

It is desirable to provide a protection structure for an on-board battery, the protection structure being configured to hold a battery stack while suspending the battery stack by a frame fixed to a vehicle body, thereby protecting the battery stack from travelling vibration and collision impact of the vehicle.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A protection structure 11 for an on-board battery 10 according to an embodiment of the disclosure will be described. The front-rear direction illustrated on the paper represents a front-rear direction of a vehicle 12, the right-left direction illustrated on the paper represents a vehicle width direction of the vehicle 12, and the up-down direction illustrated on the paper represents a height direction of the vehicle 12.

Figure 1:
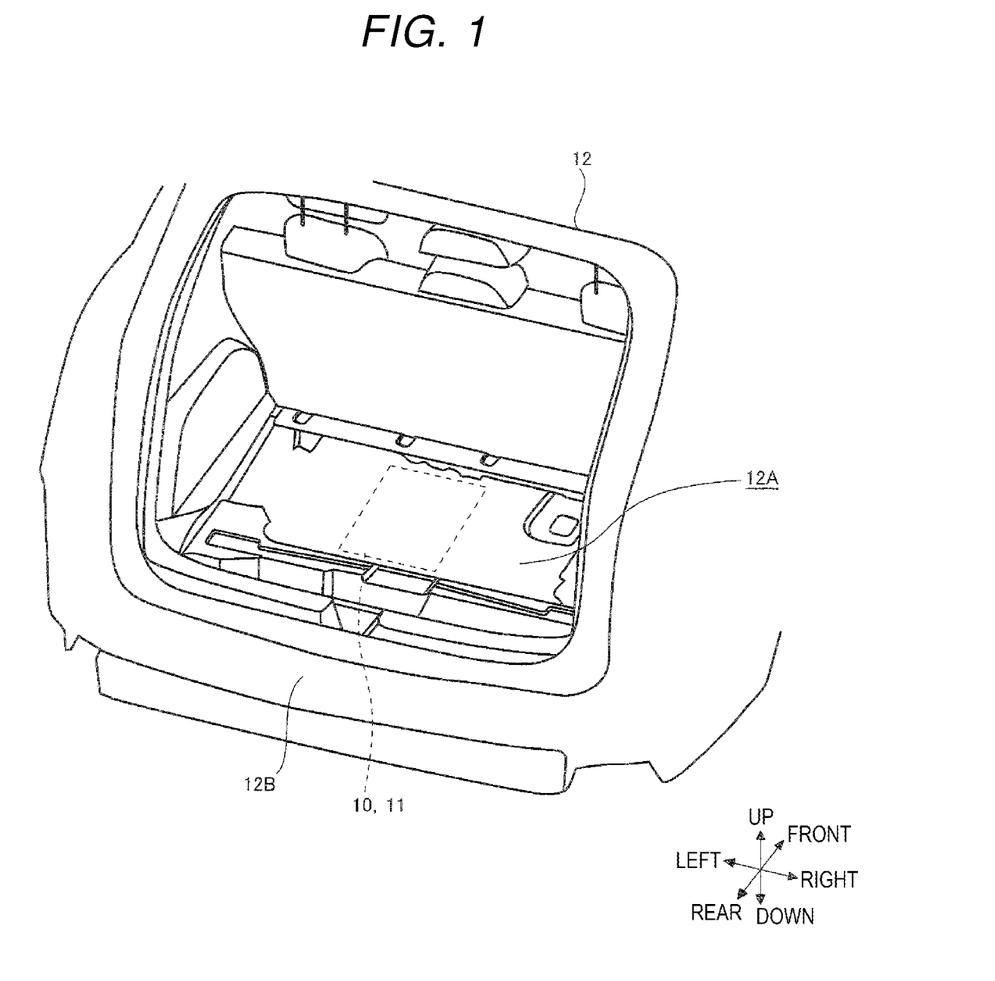
FIG. 1 is a schematic diagram of a vehicle equipped with a protection structure for an on-board battery of an embodiment of the disclosure.
Figure 2:
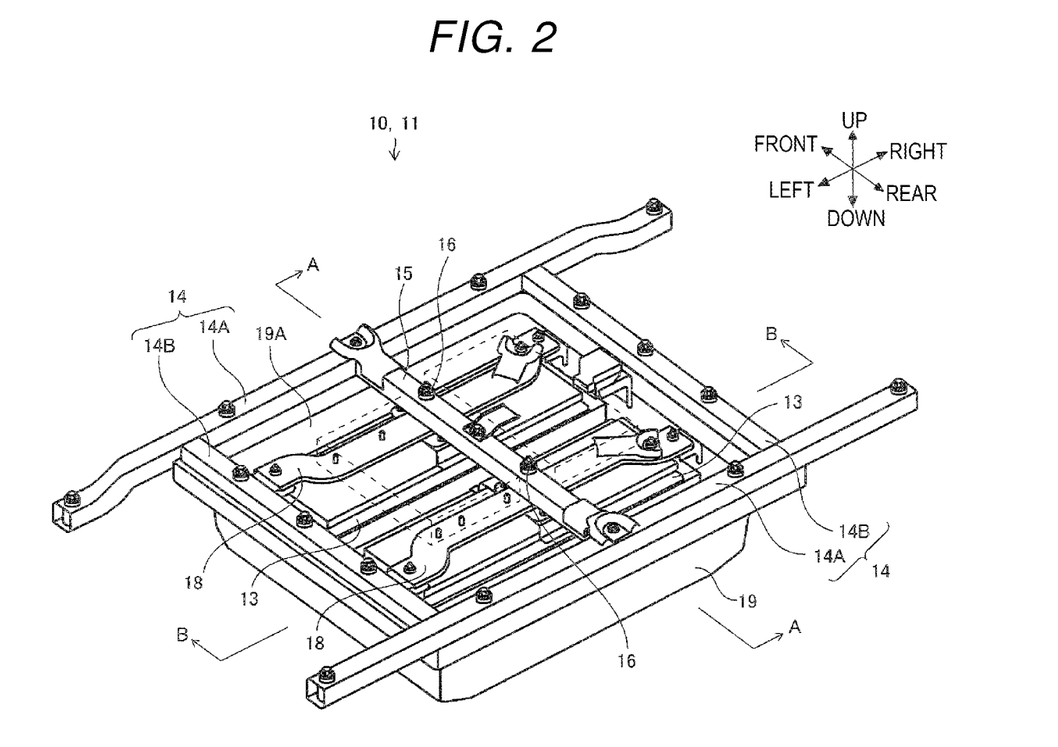
FIG. 2 is a perspective view of the protection structure for the on-board battery of the embodiment of the disclosure.
Figure 3:
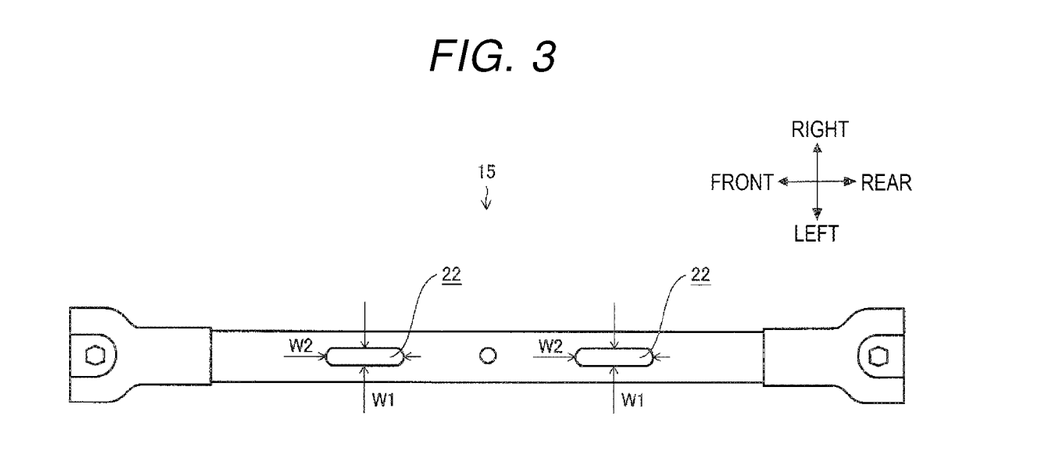
FIG. 3 is a top view of the protection structure for the on-board battery of the embodiment of the disclosure.
Figure 4A:
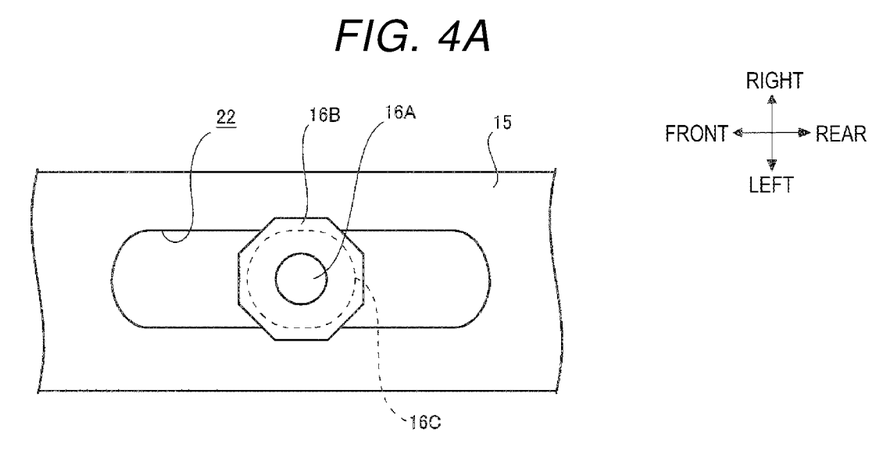
FIG. 4A is a top view of the protection structure for the on-board battery of the embodiment of the disclosure.
Figure 4B:
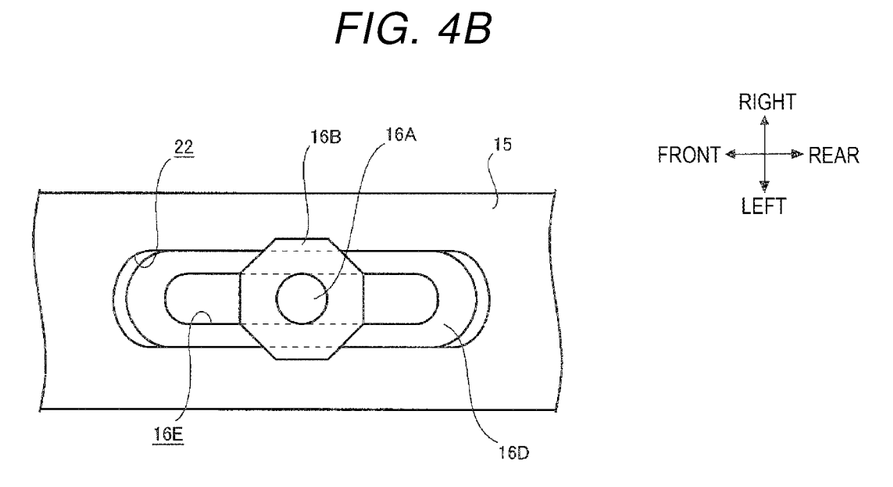
FIG. 4B is a top view of the protection structure for the on-board battery of the embodiment of the disclosure.
Figure 4C:
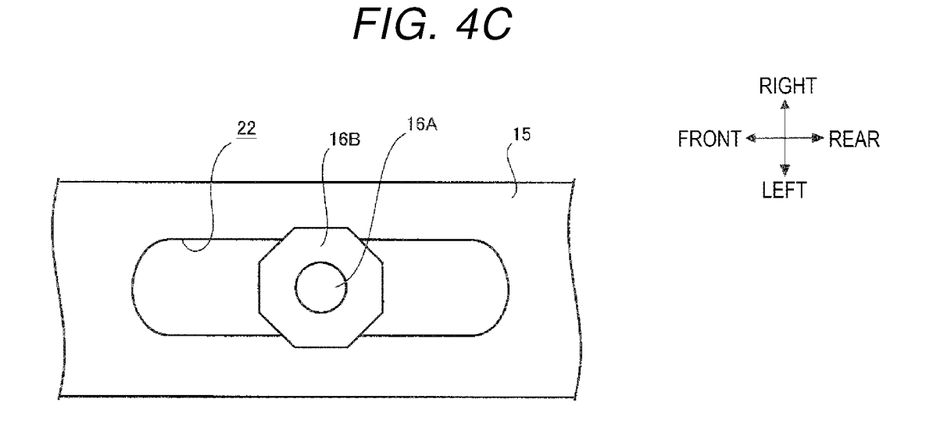
FIG. 4C is a top view of the protection structure for the on-board battery of the embodiment of the disclosure.
Figure 5:
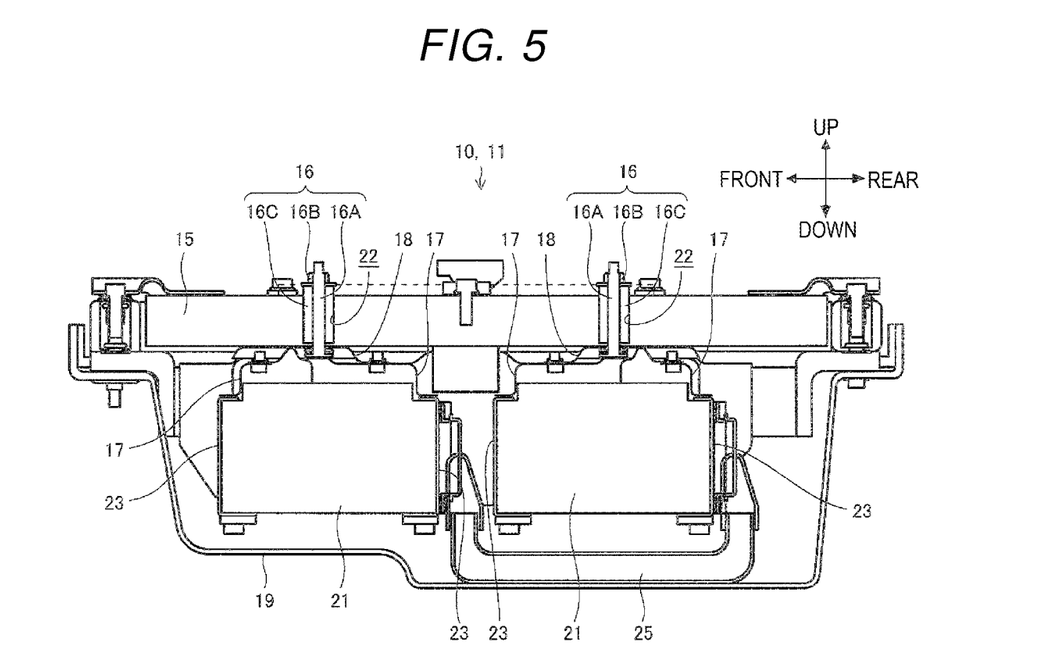
FIG. 5 is a sectional view of the protection structure for the on-board battery of the embodiment of the disclosure.
Figure 6:
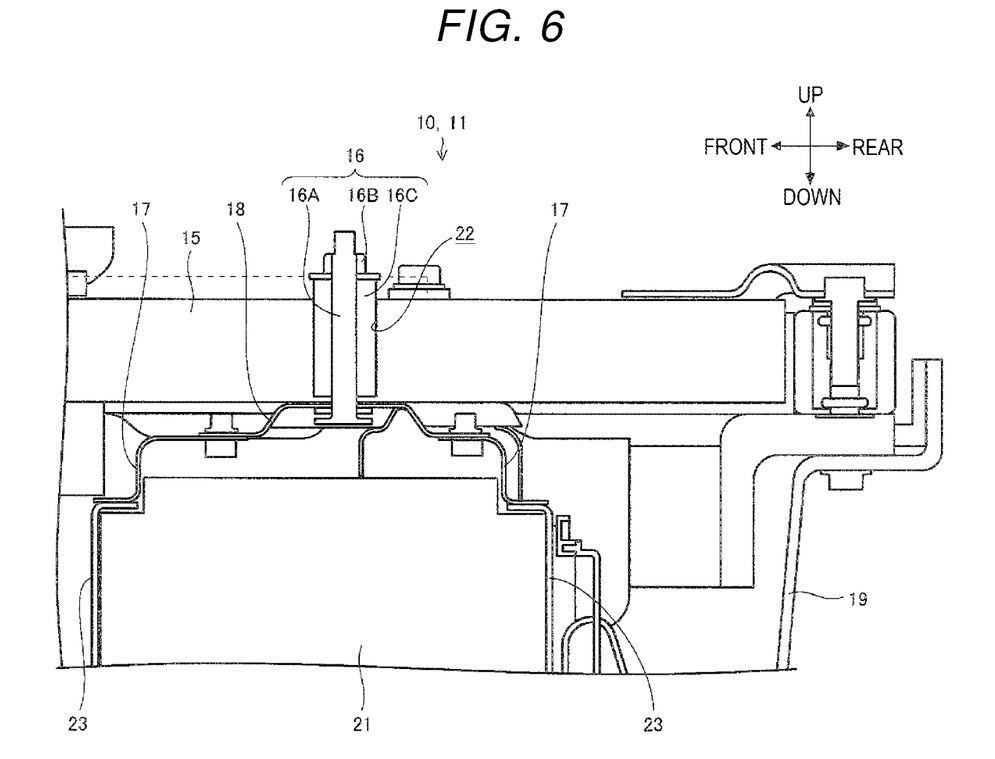
FIG. 6 is a sectional view of the protection structure for the on-board battery of the embodiment of the disclosure.
Figure 7:
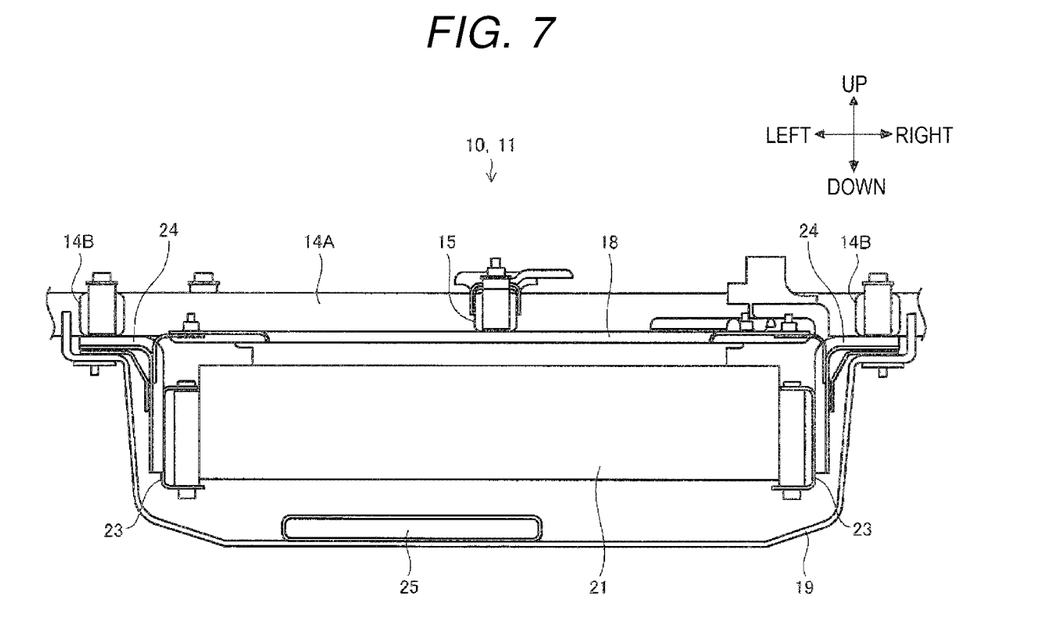
FIG. 7 is a sectional view of the protection structure for the on-board battery of the embodiment of the disclosure.
Figure 8:
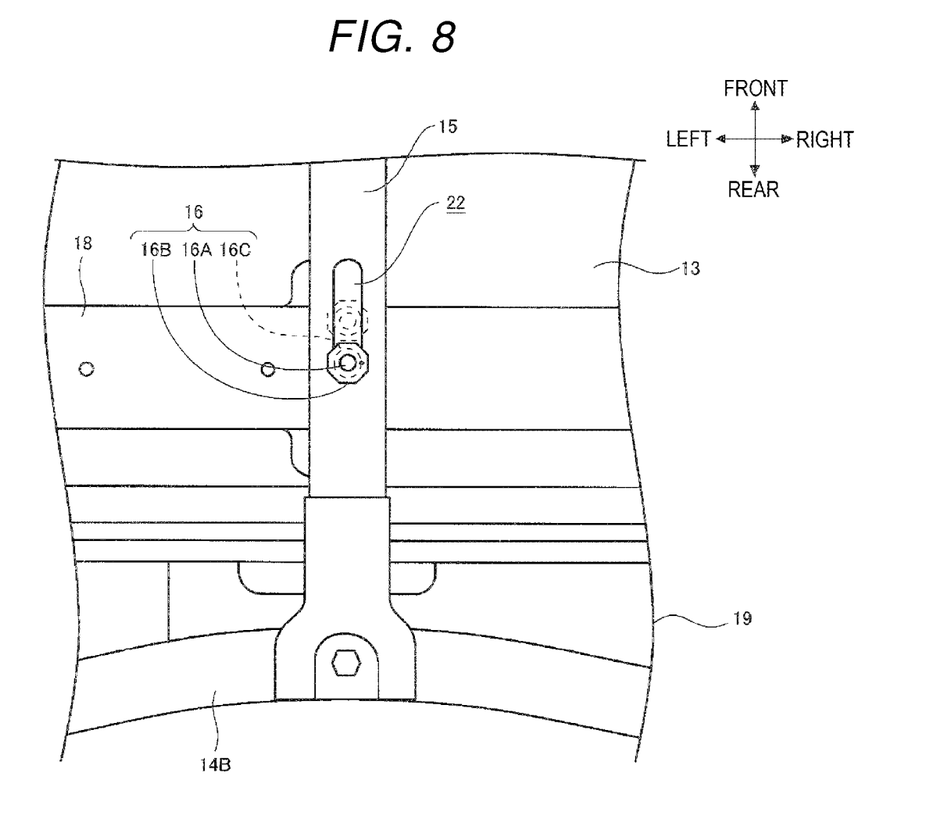
FIG. 8 is a schematic diagram of the protection structure for the on-board battery of the embodiment of the disclosure.
Figure 9:
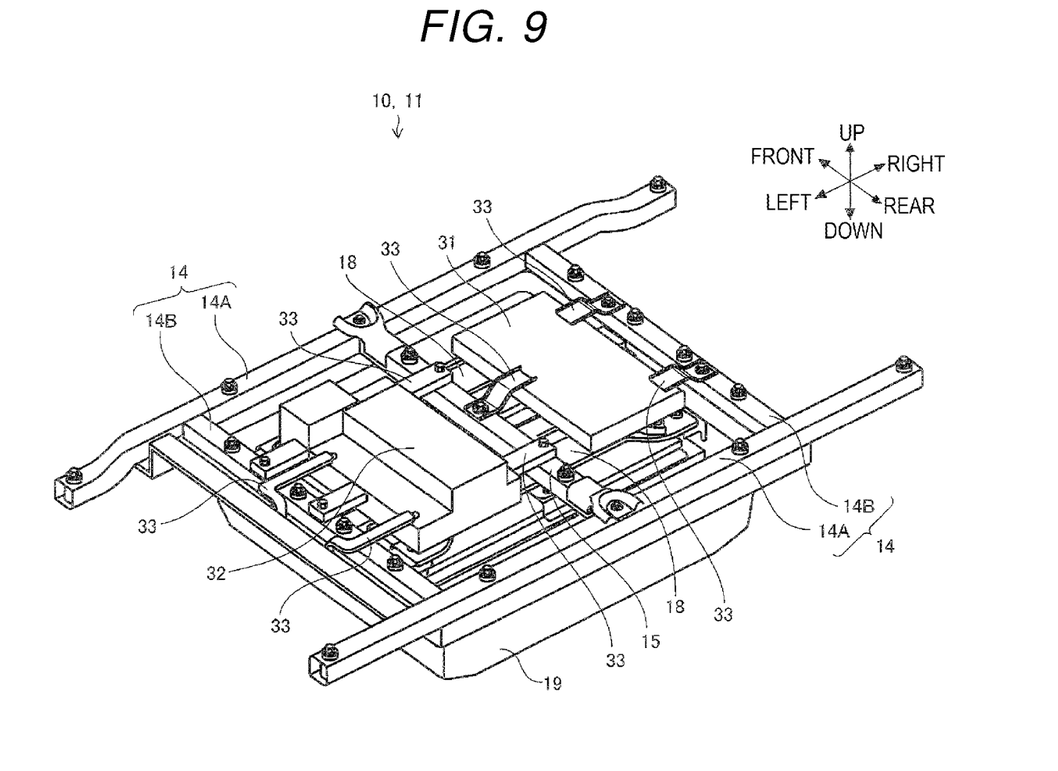
FIG. 9 is a perspective view of the protection structure for the on-board battery of the embodiment of the disclosure.

FIG. 1 is a schematic diagram of a vehicle 12 equipped with a protection structure 11 for an on-board battery 10 of this embodiment. FIG. 2 is a perspective view of the protection structure 11 for the on-board battery 10 of this embodiment. FIG. 3 is a top view of a protective frame 15 of the protection structure 11 for the on-board battery 10 of this embodiment. FIGS. 4A to 4C are top views of a fixing member 16 of the protection structure 11 for the on-board battery 10 of this embodiment. FIG. 5 is a sectional view of the protection structure 11 for the on-board battery 10 of this embodiment. FIG. 6 is an enlarged sectional view of the protection structure 11 for the on-board battery 10 of this embodiment. FIG. 7 is a sectional view of the protection structure 11 for the on-board battery 10 of this embodiment. FIG. 8 is a schematic diagram of the protective frame 15 at the time of pole impact of the vehicle 12. FIG. 9 is a perspective view of the protection structure 11 for the on-board battery 10 of this embodiment. Note that, for convenience of explanation, a BCU 31 and a junction box 32 are omitted from the figures in FIGS. 2 to 8.

The vehicle 12, which is an automobile, a train, or the like, is mounted with the on-board battery 10 for supplying power to a motor and various electrical components. Due to spread of electrical vehicles (EV), hybrid electrical vehicles (HEV), plug-in hybrid electrical vehicles (PHEV), etc., in recent years, such automobile vehicles 12 are also mounted with an on-board battery 10 having a high electricity storage function.

Basically, the protection structure 11 for the on-board battery 10 protects the on-board battery 10 having battery stacks 13 from vibration and collision impact of the vehicle 12 and so on. As illustrated in FIG. 1, the on-board battery 10 and the protection structure 11 thereof are disposed, for example, in a housing space 12A under a rear floor on a rear side of the vehicle 12, in a state in which the longer direction of the on-board battery 10 coincides with the right-left direction of the vehicle 12. Note that the positions of the on-board battery 10 and the protection structure 11 thereof are not limited to the housing space 12A under the rear floor and may be a housing space, such as under a front floor on which a driver's seat and a passenger seat of the vehicle 12 are placed.

As illustrated in FIG. 2, the protection structure 11 for the on-board battery 10 mainly includes a frame body 14, a protective frame 15, fixing members 16, steady brackets (refer to FIG. 5), device-mounting brackets 18, and suspending brackets 24 (refer to FIG. 7). The frame body 14 fixes the on-board battery 10 to a vehicle body. The protective frame 15 is coupled to the frame body 14 in a crossing direction. The fixing members 16 are fixed to the protective frame 15 to suspend and support the battery stacks 13. In this embodiment, the frame body 14 may serve as a "first frame", and the protective frame 15 may serve as a "second frame".

The on-board battery 10 mainly includes battery stacks 13, a battery case 19, a battery control unit (BCU) 31 (refer to FIG. 9) and a junction box 32 (refer to FIG. 9) as electronic devices, and electric wiring (not illustrated). The battery stack 13 includes plural battery cells 21 (refer to FIG. 5) that are stacked in a serial connection manner. The battery case 19 contains the plural battery stacks 13. The electric wiring electrically couples the battery stacks 13 and the electronic devices.

As illustrated in the drawing, the battery case 19 is formed of a steel plate, such as of iron or aluminum, or a synthetic resin plate, into an approximately box shape with a top opening. The battery case 19 has a longer direction in the vehicle width direction of the vehicle 12 and has a shorter direction in the front-rear direction of the vehicle 12, and it has a space for containing two battery stacks 13 in an approximately parallel manner in the front-rear direction of the vehicle 12.

The battery stack 13 includes the plural battery cells 21 (refer to FIG. 5) that are serially coupled in a casing 23 (refer to FIG. 5) of the battery stack 13. The battery cell 21 is, for example, a secondary battery, such as a nickel hydrogen battery or a lithium ion battery. The battery cells 21 each have, for example, a rectangular plate shape, and are arranged with a gap on each of forward and rear sides, at an equal interval along the longer direction of the battery stack 13 (vehicle width direction of the vehicle 12).

The frame body 14 is, for example, a long steel member such as a rectangular steel tube. The frame body 14 is fixed to an upper portion of the battery case 19 so as to surround an opening 19A of the battery case 19. The frame body 14 is fixed to end portions of the battery case 19 in the front-rear and right-left directions of the vehicle 12. The frame body 14 includes a pair of longer frames 14A and a pair of shorter frames 14B. The longer frames 14A extend in the vehicle width direction of the vehicle 12. The shorter frames 14B extend in a direction approximately orthogonal to the longer frames 14A while bridging between the longer frames 14A. The frame body 14 is fixed to a vehicle body frame (not illustrated) around the battery case 19, whereby the battery case 19 is fixed to the vehicle body.

The protective frame 15 is, for example, a long steel member, such as a rectangular steel tube, and is disposed to bridge between the longer frames 14A along the front-rear direction of the vehicle 12, on an upper side of the opening 19A of the battery case 19. As illustrated in the drawing, the protective frame 15 is disposed at an approximate center in the longer direction of the battery case 19 (vehicle width direction of the vehicle 12).

In one example in which pole impact occurs due to a pole colliding from a center part on a rear side of the vehicle 12, a large impact is locally applied to the vehicle 12, and a rear bumper 12B (refer to FIG. 1) protrudes toward inside of the vehicle 12. At this time, in the protection structure 11 for the on-board battery 10, the protective frame 15 receives the impact and thereby prevents damage to the battery case 19 as well as prevents damage to the battery stacks 13 in the battery case 19 and the electronic devices, such as the BCU 31.

The fixing member 16 includes, for example, a bolt 16A (refer to FIG. 5), a nut 16B (refer to FIG. 5), and a bolt-fixing spacer 16C (refer to FIG. 5), and it is fixed to an escape hole 22 (refer to FIG. 3) of the protective frame 15. Although details will be described later, a lower end side of the fixing member 16 is engaged with a device-mounting bracket 18 that is coupled to the steady bracket 17 fixed to the casing 23 of the battery stack 13, whereas an upper end side of the fixing member 16 is fixed to the protective frame 15. With this structure, the battery stack 13 is suspended and supported at its approximate center in the longer direction by the protective frame 15. Note that the bolt-fixing spacer 16C uses, for example, a metal material such as aluminum or iron.

The steady bracket 17 (refer to FIG. 5) is formed by, for example, bending an approximately flat metal plate. The steady bracket 17 is disposed at the approximate center in the longer direction of the battery stack 13 and is coupled to the device-mounting bracket 18 so as to suspend and support the battery stack 13.

The device-mounting bracket 18 is formed by, for example, bending an approximately flat metal plate, and it is disposed above the battery stack 13 along the longer direction of the battery stack 13 (vehicle width direction of the vehicle 12). The device-mounting bracket 18 is used for disposing the BCU 31 and the junction box 32 above the battery stack 13.

The suspending bracket 24 (refer to FIG. 7) is formed by, for example, bending an approximately flat metal plate. The suspending bracket 24 is fixed to the casing 23 at each end in the longer direction of the battery stack 13 so as to suspend and support the battery stack 13.

Note that, as illustrated in FIG. 5, a cooling duct 25, which is formed of insulating resin, such as polyethylene or polypropylene, is disposed in the battery case 19. In the battery case 19, cooling air that is conditioned by a vehicle air conditioner (not illustrated) is made to flow via the cooling duct 25, whereby the battery cells 21 in the two battery stacks 13 are cooled.

As illustrated in FIG. 3, the protective frame 15 has two escape holes 22 that penetrate in the thickness direction. The escape hole 22 is an elongated hole in the longer direction of the protective frame 15 (front-rear direction of the vehicle 12) and has an approximately ellipse shape in a top view. The escape hole 22 has a width W1 in a shorter direction (vehicle width direction of the vehicle 12), and the width W1 is at least approximately the same as or greater than the diameter of the bolt 16A. The escape hole 22 has a width W2 in a longer direction (front-rear direction of the vehicle 12), and the width W2 is approximately three times of the diameter of the bolt 16A, for example.

As illustrated in FIG. 4A, the bolt-fixing spacer 16C has, for example, a cylindrical shape, and the bolt 16A is inserted in the center of the bolt-fixing spacer 16C. The bolt-fixing spacer 16C is fitted into the escape hole 22 in such a manner as to be in contact with an inner side surface of the escape hole 22 in the shorter direction of the escape hole 22. Meanwhile, the bolt-fixing spacer 16C is positioned at an approximate center of the escape hole 22 in the longer direction of the escape hole 22 and has a gap with a size of approximately one bolt 16A in the front-rear direction thereof. Note that this gap may have a size of approximately two bolts 16A and can be changed in design as desired.

Although details will be described later with reference to FIG. 8, this structure functions as follows. When pole impact occurs due to a pole colliding from a center part on a rear side of the vehicle 12, the escape hole 22 moves toward the front of the vehicle 12 along with the protective frame 15. At this time, the bolt-fixing spacer 16C is displaced to a position on a rear side of the vehicle 12 of the escape hole 22 by using the gap of the escape hole 22. The bolt 16A that is inserted into the bolt-fixing spacer 16C remains at the initially fixed position relative to the battery case 19 (refer to FIG. 2), and the battery stack 13, which is supported by the bolt 16A, also remains at the initially mounted position in the battery case 19.

As a result, in the battery case 19, the battery stack 13 is prevented from hitting the other battery stack 13 and surrounding components, whereby damage to the battery cells 21 in the battery stack 13 is prevented.

As illustrated in FIG. 4B, a bolt-fixing spacer 16D may have approximately the same shape as the escape hole 22. The bolt-fixing spacer 16D has an escape hole 16E at its center. As illustrated in the drawing, the bolt-fixing spacer 16D is fitted to the inside in the shorter direction of the escape hole 22, while being disposed with a slight gap in the longer direction of the escape hole 22.

In this structure, when pole impact occurs in the vehicle 12, the escape hole 22 and the bolt-fixing spacer 16D move toward the front of the vehicle 12 along with the protective frame 15. Meanwhile, the bolt 16A is displaced to the rear side of the vehicle 12 of the escape hole 16E. Thus, as in the case of the bolt-fixing spacer 16C, the battery stack 13 remains at the initially mounted position in the battery case 19, whereby similar effects are obtained.

As illustrated in FIG. 4C, the fixing member 16 may not use the bolt-fixing spacers 16C and 16D, but instead, the bolt 16A may be directly inserted into the escape hole 22 and be tightened with the nut 16B so as to suspend and support the battery stack 13.

In this structure, when pole impact occurs in the vehicle 12, the escape hole 22 moves toward the front of the vehicle 12 along with the protective frame 15. Meanwhile, the bolt 16A is displaced to the rear side of the vehicle 12 of the escape hole 22. Thus, as in the case of the bolt-fixing spacer 16C, the battery stack 13 remains at the initially mounted position in the battery case 19, whereby similar effects are obtained.

FIG. 5 is a sectional view in an A-A line direction illustrated in FIG. 2 and illustrates a cross section at an approximate center of the battery case 19 to which the protective frame 15 is disposed. FIG. 6 is an enlarged sectional view of rear upper portions of the on-board battery 10 and the protection structure 11 thereof illustrated in FIG. 5. FIG. 7 is a sectional view in a B-B line direction illustrated in FIG. 2 and illustrates a cross section of a suspending support structure at each end in the longer direction of the battery stack 13.

As illustrated in FIGS. 5 to 7, in the battery case 19, the two battery stacks 13 are arranged in approximately parallel in the front-rear direction of the vehicle 12, and the two battery stacks 13 are supported at their both ends and centers and are thereby suspended and supported by the protective frame 15. With this structure, the battery case 19 may not use a frame structure for protecting the battery stacks 13 from impact due to vehicle collision or may use a simple frame structure. This enables preventing increase in production cost and weight of the battery case 19.

In one example, as illustrated in FIGS. 5 and 6, an end of the steady bracket 17 is fixed to the casing 23 at the approximate center of the battery stack 13 by welding or the like. The casing 23 fixes both ends in the front-rear direction of the vehicle 12 of the battery cells 21. The other end of the steady bracket 17 is fixed to the device-mounting bracket 18 via a bolt or the like. The device-mounting bracket 18 has an engaging hole (not illustrated) at the approximate center in the front-rear direction of the vehicle 12. The bolt 16A is inserted into this engaging hole, whereby the approximate center of the battery stack 13 is suspended and supported by the protective frame 15 via the fixing member 16.

The fixing member 16 fixes the device-mounting bracket 18 to the protective frame 15 in such a manner that the nut 16B is tightened with the bolt 16A to make an upper surface of the device-mounting bracket 18 and a bottom surface of the protective frame 15 be in contact with each other. This structure supports the battery stack 13 at the three points of the both ends and the center in the longer direction and thereby greatly reduces an amplitude amount at the approximate center of the battery stack 13.

On the other hand, as illustrated in FIG. 7, an end of the suspending bracket 24 is fixed to the casing 23 at each end in the longer direction of the casing 23 of the battery stack 13 by welding or the like. The other end of the suspending bracket 24 is fixed to the shorter frame 14B of the frame body 14 via a bolt or the like.

This structure reduces amplitude at the approximate center of the battery stack 13. Thus, although the battery stack 13 is suspended in the battery case 19, amplitude in the longer direction of the battery stack 13 is reduced, even when the total length in the longer direction of the battery stack 13 is increased. As a result, the battery stack 13 hardly hits surrounding components, such as the battery case 19 and the cooling duct 25, due to vibration during traveling of the vehicle 12. Moreover, it is possible to increase the number of the battery cells 21 contained in one battery stack 13 in order to achieve high output and high capacity of the on-board battery 10, while each of the battery cells 21 is prevented from being broken by vibration.

As illustrated in FIG. 8, in one example in which pole impact occurs due to a pole colliding from a center part on a rear side of the vehicle 12, a large impulsive force is locally applied to the vehicle 12, and the rear bumper 12B (refer to FIG. 1) protrudes toward inside of the vehicle 12. The impulsive force is received by the protective frame 15 and the frame body 14, which is fixed to the vehicle body, whereby the battery case 19 is prevented from being greatly deformed and damaged.

Nevertheless, depending on the magnitude of the impulsive force, the longer frame 14A of the frame body 14 may be bent toward the front of the vehicle 12, and the protective frame 15 may protrude toward the front of the vehicle 12 or be bent in the vehicle width direction. In accordance with movement of the protective frame 15 toward the front of the vehicle 12 by the impulsive force, the escape hole 22 of the protective frame 15 also moves toward the front of the vehicle 12. At this time, the bolt-fixing spacer 16C illustrated in FIG. 4A slides on the inner side surface of the escape hole 22 and is displaced to the rear side of the vehicle 12 in the escape hole 22. As a result, the bolt 16A, which is inserted into the bolt-fixing spacer 16C, and the nut 16B, are also displaced to the rear side of the vehicle 12 in the escape hole 22.

That is, due to the movement of the escape hole 22 toward the front of the vehicle 12 along with the protective frame 15 by the impulsive force, the bolt 16A and the bolt-fixing spacer 16C remain at the initially mounted position relative to the battery case 19 (refer to FIG. 2). Then, as illustrated in the drawing, the bolt 16A and the bolt-fixing spacer 16C move from the center toward the rear end side in the escape hole 22.

As described above, in the case of using the bolt-fixing spacer 16D illustrated in FIG. 4B, while the bolt-fixing spacer 16D moves toward the front of the vehicle 12 along with the protective frame 15, the bolt 16A is displaced to the rear side of the vehicle 12 in the escape hole 16E of the bolt-fixing spacer 16D. Thus, the bolt 16A remains at the initially mounted position relative to the battery case 19. On the other hand, in the case of directly inserting the bolt 16A into the escape hole 22 as illustrated in FIG. 4C, the bolt 16A is displaced to the rear side of the vehicle 12 in the escape hole 22 and thereby remains at the initially mounted position relative to the battery case 19.

This structure enables the battery stack 13, which is supported by the bolt 16A, to remain at approximately the same position as the initially fixed position relative to the battery case 19, instead of moving toward the front of the vehicle 12 along with the protective frame 15. As a result, the battery stack 13 is prevented from hitting a side surface of the battery case 19 and hitting the other battery stack 13 in the battery case 19 at the time the pole impact occurs. Moreover, each of the battery cells 21 in the battery stack 13 is also prevented from being damaged by collision.

As illustrated in FIG. 9, in the on-board battery 10, the BCU 31 and the junction box 32 as electronic devices are disposed on the upper surfaces of the device-mounting brackets 18 above the battery stack 13 of the battery case 19. As described above, the BCU 31 is disposed between the shorter frame 14B on the right side on the paper and the protective frame 15, whereas the junction box 32 is disposed between the shorter frame 14B on the left side on the paper and the protective frame 15. The BCU 31 and the junction box 32 are disposed in the vicinity of the protective frame 15 such that the protective frame 15 is interposed between the BCU 31 and the junction box 32.

As illustrated in the drawing, the BCU 31 and the junction box 32 are fixed to the device-mounting brackets 18 at their back surfaces by bolts or the like and are fixed also to the protective frame 15 and the shorter frames 14B at their front surfaces via fixing brackets 33 by bolts or the like.

As described above with reference to FIG. 8, at the time the pole impact occurs, the protective frame 15 absorbs the impact and may be bent in the vehicle width direction of the vehicle 12. In such a case, the both side surfaces in the vehicle width direction of the protective frame 15 come into contact with the BCU 31 or the junction box 32 and thereby greatly reduce the amount of bending of the protective frame 15. In addition, in combination with the structure of the escape hole 22, the battery stack 13 hardly hits surrounding components, whereby each of the battery cells 21 in the battery stack 13 is prevented from being damaged by collision.

Furthermore, the protection structure 11 for the on-board battery 10 makes it possible to increase the total length in the longer direction of the battery stack 13 so as to increase the number of the battery cells 21 to be mounted. Thus, the number of the battery stacks 13 contained in the battery case 19 can be decreased, resulting in reduction in the amount of electric wiring (not illustrated) for electrically coupling the battery stacks 13 and the BCU 31, etc. As a result, production cost is reduced, and the weight of the whole on-board battery 10 is reduced. In addition, reduction in the amount of electric wiring causes decrease in internal resistance of the on-board battery 10, whereby the amount of electric consumption and the amount of heat generation of the on-board battery 10 are reduced.

In this embodiment, as described above, the pair of the steady brackets 17 are respectively fastened to the both ends of the device-mounting bracket 18 in the front-rear direction of the vehicle 12 by bolts, and the device-mounting bracket 18 is suspended and supported by the protective frame 15 via the fixing member 16. However, the structure is not limited to this. In one example, the steady bracket 17 may be fixed to bridge the casing 23 of the battery stack 13 and may be directly suspended and supported by the protective frame 15 via the fixing member 16. Alternatively, the steady bracket 17 may be omitted, and the device-mounting bracket 18 may be directly fixed to the casing 23 of the battery stack 13 by welding or the like.

As described above, the protective frame 15 has the escape hole 22. At the time the pole impact occurs, the escape hole 22 moves toward the front of the vehicle 12 along with the protective frame 15, and the fixing member 16 remains at the initially fixed position in the escape hole 22, whereby the battery cells 21 are prevented from being damaged. However, the structure is not limited to this. In one example, the escape hole 22 may be provided also to the part where the suspending bracket 24 is fixed, of the shorter frame 14B of the frame body 14. This structure prevents the battery stack 13 from moving in the battery case 19, whereby the battery cells 21 are prevented from being damaged, also at the time an impulsive force is applied to the shorter frame 14B by vehicle collision. Various other modifications and alterations can be made without departing from the gist of the disclosure.

Next, a protection structure 51 for an on-board battery 50 according to another embodiment of the disclosure will be described in detail based on the drawings. Note that this embodiment is basically described by using the same reference numerals for the same members, and repeated description is omitted. The description of the protection structure 51 for the on-board battery 50 will be focused on the structure different from that of the protection structure 11 for the on-board battery 10, which is described above with reference to FIGS. 1 to 9. The same components are basically denoted by the same reference numerals, and repeated description is omitted.

Figure 10:
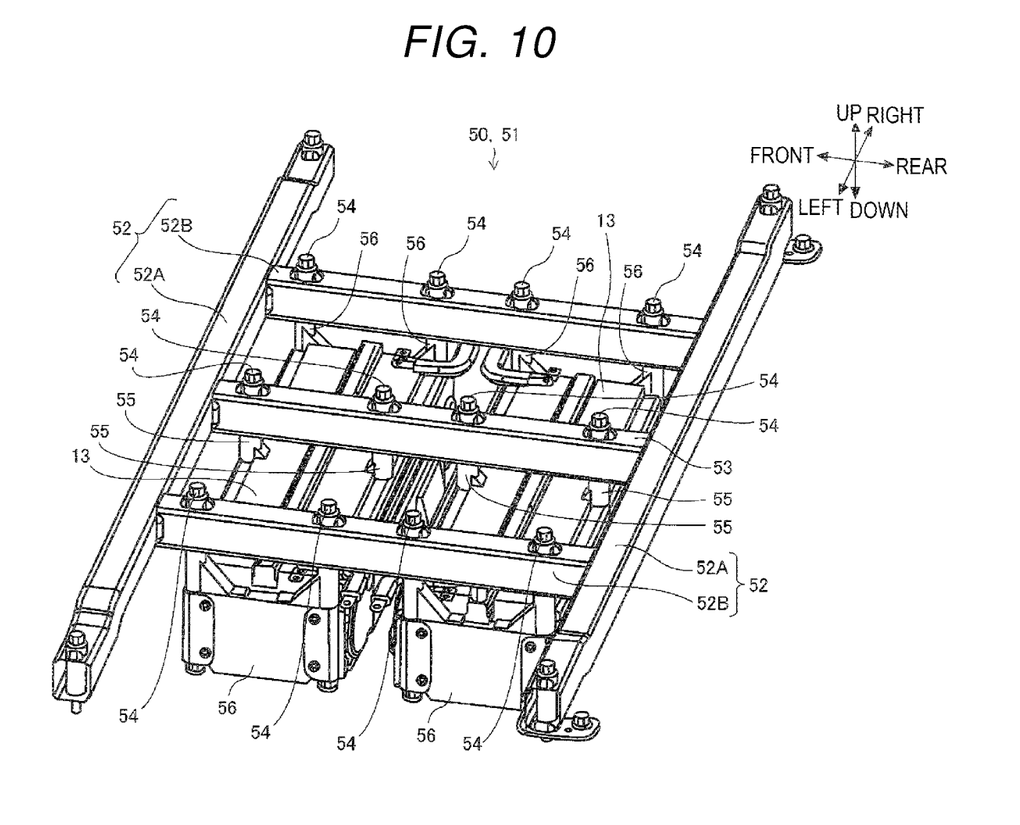
FIG. 10 is a perspective view of a protection structure for an on-board battery of an embodiment of the disclosure.
Figure 11:
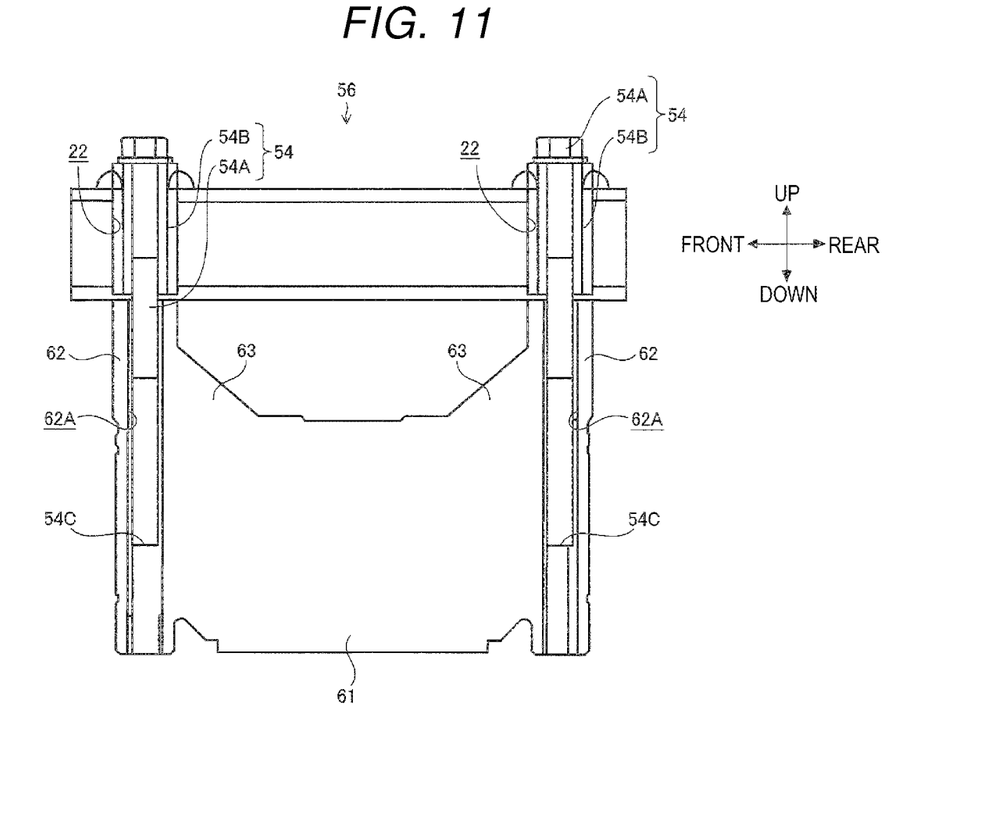
FIG. 11 is a front view of the protection structure for the on-board battery of the embodiment of the disclosure.
Figure 12:
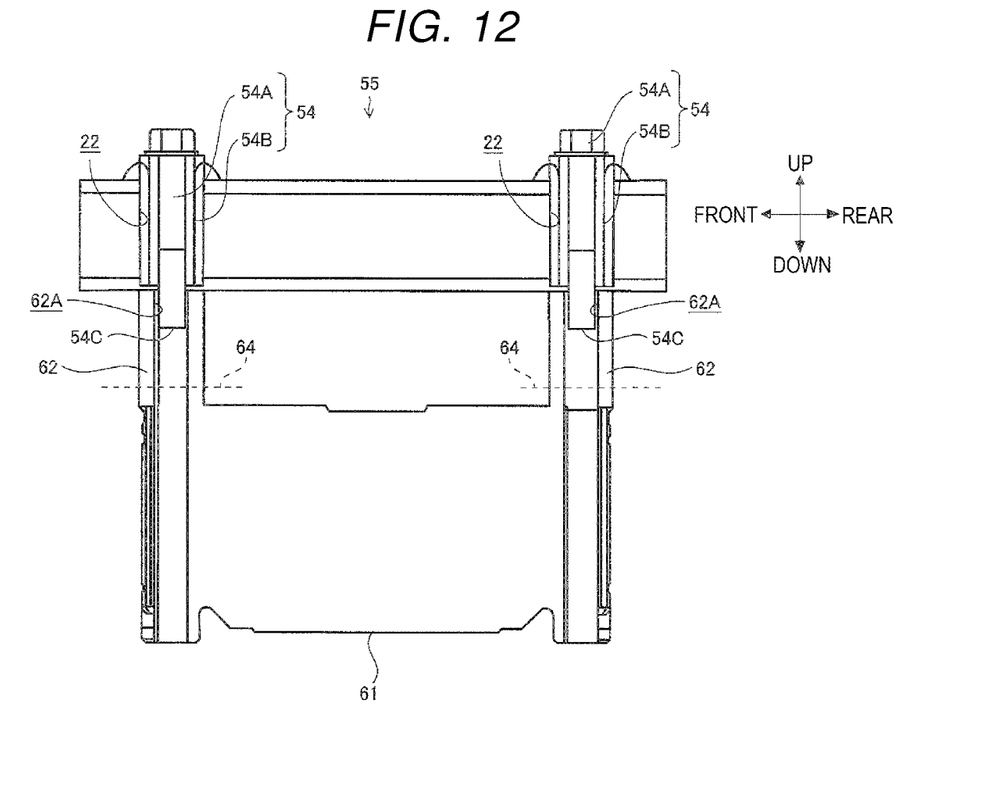
FIG. 12 is a front view of the protection structure for the on-board battery of the embodiment of the disclosure.

FIG. 10 is a perspective view of the protection structure 51 for the on-board battery 50 of this embodiment. FIG. 11 is a front view of an end plate 56 of the protection structure 51 for the on-board battery 50 of this embodiment. FIG. 12 is a front view of a center plate 55 of the protection structure 51 for the on-board battery 50 of this embodiment. Note that the front-rear direction illustrated on the paper represents the front-rear direction of the vehicle 12, the right-left direction illustrated on the paper represents the vehicle width direction of the vehicle 12, and the up-down direction illustrated on the paper represents the height direction of the vehicle 12.

As illustrated in FIG. 10, the protection structure 51 for the on-board battery 50 mainly includes a frame body 52, a protective frame 53, fixing members 54, center plates 55, and pairs of end plates 56. The frame body 52 fixes the on-board battery 50 to a vehicle body. The protective frame 53 is coupled to the frame body 52 in a crossing direction. The fixing members 54 suspend and support the battery stacks 13. The center plates 55 are fixed at the approximate centers of the battery stacks 13. The end plates 56 are fixed at the both ends of the battery stack 13. In this embodiment, the frame body 52 may serve as a "first frame", and the protective frame 53 may serve as a "second frame".

As illustrated in the drawing, the on-board battery 50 mainly includes two battery stacks 13, but does not include the battery case 19 of the on-board battery 10, and the battery stacks 13 are suspended and supported by the frame body 52 and the protective frame 53 via the center plates 55 and the end plates 56. Note that, for convenience of explanation, the BCU 31 and the junction box 32 are omitted from the figures in FIG. 10, but they may be disposed above the battery stacks 13 via the device-mounting brackets 18, as illustrated in FIG. 9.

The frame body 52 is, for example, a long steel member, such as a rectangular steel tube, and includes a pair of longer frames 52A and a pair of shorter frames 52B. The longer frames 52A extend in the vehicle width direction of the vehicle 12. The shorter frames 52B extend in a direction approximately orthogonal to the longer frames 52A while bridging between the longer frames 52A. The protective frame 53 is, for example, a long steel member, such as a rectangular steel tube, and is disposed to bridge between the longer frames 52A along the front-rear direction of the vehicle 12.

As illustrated in the drawing, the frame body 52 and the protective frame 53 have a ladder shape, and the pair of the shorter frames 52B are respectively disposed above the both ends in the longer direction of the battery stack (vehicle width direction of the vehicle 12). On the other hand, the protective frame 53 is disposed above the approximate center in the longer direction of the battery stack 13. The pair of the shorter frames 52B and the protective frame 53 are arranged parallel in a direction approximately orthogonal to the longer frame 52A.

The fixing member 54 includes, for example, a bolt 54A and a bolt-fixing spacer 54B. The bolt 54A is inserted into the escape hole 22 of each of the frame body 52 and the protective frame 53, and a tip 54C thereof is fitted into a supporting axial part 62 of each of the center plate 55 and the end plate 56. As in the bolt-fixing spacers 16C and 16D, the bolt-fixing spacer 54B is fitted into the escape hole 22.

As illustrated in FIG. 11, the end plate 56 is made of, for example, a plate-shaped resin, a steel plate, or the like, and covers a front side surface and a rear side surface of the battery cell 21 that are positioned at both ends. The end plate 56 includes a plate-shaped base part 61, a pair of supporting axial parts 62 disposed at both ends of the base part 61 into one body, and reinforcing ribs permanently affixed to the base part 61 and the supporting axial parts 62.

As illustrated in the drawing, the supporting axial part 62 has a threaded hole 62A into which the bolt 54A is inserted and fitted. The threaded hole 62A extends lower than the reinforcing rib 63. In the state in which the battery stack 13 is suspended and supported by the frame body 52, the tip 54C of the bolt 54A comes lower than the reinforcing rib 63.

With this structure, as described above with reference to FIG. 8, at the time a large impulsive force is applied from the rear side of the vehicle 12 by pole impact, the reinforcing rib 63 and the bolt 54A, which is inserted into the threaded hole 62A, receive the impulsive force and prevent the end plate 56 from being damaged. Meanwhile, the battery stack 13 remains at the initially mounted position of the vehicle body.

As illustrated in FIG. 12, the center plate 55 is made of, for example, a plate-shaped resin, a steel plate, or the like, and is disposed inside the casing 23 of the battery stack 13 and at the approximate center of the battery stack 13. The center plate 55 includes a plate-shaped base part 61 and a pair of supporting axial parts 62 disposed at both ends of the base part 61 into one body. The center plate 55 differs from the end plate 56 in having no reinforcing rib 63.

As illustrated in the drawing, the supporting axial part 62 has a threaded hole 62A into which the bolt 54A is inserted and fitted. However, in the center plate 55, the threaded hole 62A does not reach the base part 61. That is, this threaded hole 62A has a length that is short but enough to stably suspend and support the center plate 55, and the tip 54C of the bolt 54A does not come to the region where the base part 61 is disposed.

In this structure, when a large impulsive force is applied to the vehicle 12 by pole impact, the frame body 52 may be curved toward the front of the vehicle 12, while the protective frame 53 may also be protruded toward the front of the vehicle 12. In this case, as indicated by the dotted line 64, the supporting axial part 62 in the region where the bolt 54A does not exist above the base part 61, is damaged and fractured. Then, the approximate center of the battery stack 13 comes off from the protective frame 53.

That is, the end plate 56 remains being suspended and supported by the frame body 52, whereas the center plate 55 comes off from the protective frame 53, whereby the battery stack 13 remains at approximately the same position as the initially fixed position. As a result, the battery stack 13 is prevented from hitting surrounding components on the vehicle 12 and hitting the other battery stack 13 at the time the pole impact occurs. Moreover, each of the battery cells 21 in the battery stack 13 is also prevented from being broken by collision.

In this embodiment, as described above, at the time vehicle collision, such as pole impact, occurs in the vehicle 12, the supporting axial part 62 of the center plate 55 is fractured by the impulsive force, whereby the battery stack 13 remains at the initially fixed position. However, the configuration is not limited to this. In one example, as described above with reference to FIG. 8, the escape hole 22 may move toward the front of the vehicle 12 along with the protective frame 53 by the impulsive force, and the bolt 54A may remain at the initial position in the escape hole 22. This makes the battery stack 13 remain at the initially fixed position. Alternatively, the battery stack 13 may be maintained at the initially fixed position by a combination of the structure of the supporting axial part 62 of the center plate 55 that fractures and the structure of the escape hole 22 that allows the bolt 54A to remain at the initial position.

As described above, the on-board battery 50 does not include the battery case 19, and the battery stack 13 is exposed. However, the structure is not limited to this. In one example, as in the on-board battery 10, the battery stack 13 may be contained in the battery case 19, and the frame body 52 may be fixed to an upper side of the battery case 19. Various other modifications and alterations can be made without departing from the gist of the disclosure.

In the protection structure for the on-board battery of the embodiment of the disclosure, the fixing member suspends and supports the approximate center in the longer direction of the battery stack. Thus, vibration amplitude is greatly reduced at the approximate center of the battery stack, resulting in preventing the battery cell from hitting surrounding components and being damaged by vibration. In addition, it is possible to increase the number of the battery cells in a battery stack to achieve high output and high capacity of the on-board battery.

The invention claimed is:

1. A protection structure for an on-board battery, the on-board battery comprising a battery stack and being configured to be mounted on a vehicle, the protection structure comprising:
a first frame to be coupled to an upper portion of a battery case that contains the battery stack, so as to fix the battery case to a vehicle body of the vehicle;
a second frame to be disposed above the battery case and to be coupled to the first frame;
a fixing member to be fixed to the second frame so as to suspend and support the battery stack,
the second frame to be disposed in a direction crossing a longer direction of the battery stack and at least at an approximate center in the longer direction of the battery stack;
electronic devices configured to electronically control the battery stack; and
a device-mounting bracket to be disposed above the battery stack, the device-mounting bracket extending in the longer direction of the battery stack, wherein
the electronic devices are to be fixed on an upper surface of the device-mounting bracket such that the second frame is interposed between the electronic devices.

2. The protection structure according to claim 1, further comprising:
a steady bracket comprising a first end and a second end, the first end being to be fixed to the battery stack, the second end being to be fixed to the device-mounting bracket, wherein
the fixing member is configured to suspend and support the battery stack in such a manner as to make the device-mounting bracket be partially in contact with the second frame.

3. The protection structure according to claim 2, wherein the steady bracket is disposed at the approximate center in the longer direction of the battery stack and is coupled to the device-mounting bracket so as to suspend and support the battery stack.

4. A protection structure for an on-board battery, the on-board battery comprising a battery stack and being configured to be mounted on a vehicle, the protection structure comprising:
a first frame to be coupled to an upper portion of a battery case that contains the battery stack, so as to fix the battery case to a vehicle body of the vehicle;
a second frame to be disposed above the battery case and to be coupled to the first frame; and
a fixing member to be fixed to the second frame so as to suspend and support the battery stack,
the second frame to be disposed in a direction crossing a longer direction of the battery stack and at least at an approximate center in the longer direction of the battery stack,
a pair of end plates to be respectively disposed at both ends in the longer direction of the battery stack; and
a center plate to be disposed at an approximate center in the longer direction of the battery stack, wherein
the center plate comprises
a base part that is to be disposed between battery cells in the battery stack, and
a pair of supporting axial parts that are respectively disposed at both ends of the base part, wherein
the fixing member comprises a plurality of fixing members, and
the fixing members are to be fixed to the supporting axial parts above the base part so as to suspend and support the battery stack.

5. The protection structure according to claim 4, wherein the second frame includes an escape hole in a longer direction of the second frame.

6. The protection structure according to claim 4, wherein the second frame has a ladder shape, and a pair of shorter frames of the first frame are respectively disposed above both ends in the longer direction of the battery stack.

* * * * *